United States Patent
Savva et al.

(10) Patent No.: US 12,248,444 B1
(45) Date of Patent: Mar. 11, 2025

(54) AUTOMATING DATA LOAD OPERATIONS FOR IN-MEMORY DATA WAREHOUSES

(71) Applicant: Oracle International Corporation, Redwood Shores, CA (US)

(72) Inventors: Fotis Savva, Belfast (GB); Farhan Tauheed, Zurich (CH); Marc Jolles, Zurich (CH); Onur Kocberber, Thalwil (CH); Seema Sundara, Nashua, NH (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/539,928

(22) Filed: Dec. 14, 2023

(51) Int. Cl.
G06F 16/20 (2019.01)
G06F 16/21 (2019.01)
G06F 16/2455 (2019.01)
G06F 16/28 (2019.01)

(52) U.S. Cl.
CPC ...... *G06F 16/214* (2019.01); *G06F 16/24552* (2019.01); *G06F 16/283* (2019.01)

(58) Field of Classification Search
CPC . G06F 16/214; G06F 16/24552; G06F 16/283
See application file for complete search history.

(56) References Cited

U.S. PATENT DOCUMENTS

2017/0323200 A1* 11/2017 Corvinelli .............. G06N 3/048
2020/0125568 A1* 4/2020 Idicula ................... G06N 20/20
2021/0406726 A1* 12/2021 Khatami ................. G06N 5/04

OTHER PUBLICATIONS

Article entitled "MySQL HeatWave User Guide", by Oracle, dated Nov. 19, 2022 (Year: 2022).*
Article entitled "Cardinality Estimation with Soothing Autoregressive Models", by Line et al., dated Jul. 28, 2023 (Year: 2023).*
Article entitled "Getting Started with Advanced Row Compression and Advanced Index Compression", by Oracle, dated Feb. 2019 (Year: 2019).*
Article entitled "MySQL HeatWave", by Oracle, dated Aug. 2021 (Year: 2021).*

(Continued)

*Primary Examiner* — Mahesh H Dwivedi
(74) *Attorney, Agent, or Firm* — Hickman Becker Bingham Ledesma LLP

(57) ABSTRACT

Auto-parallel-load techniques are provided for automatically loading database objects from an on-disk database system into an in-memory database system. The auto-parallel-load techniques involve a pipeline that includes several components. In one implementation, each of the pipeline components is configured to receive, extract information from, and add information to, a "state object". One or more of the pipeline components include logic that is based on the output of a corresponding machine learning model. The machine learning models used by the pipeline components may be trained from training sets from which outliers have been excluded, and may be used as the basis for generating linear models that are used during runtime, to produce estimates that affect the parameters of the auto-parallel-load operation.

18 Claims, 6 Drawing Sheets

(56) References Cited

OTHER PUBLICATIONS

Wikipedia, "Coefficient of determination", retrieved: Oct. 14, 2024, available: https://en.wikipedia.org/wiki/Coefficient_of_determination.
Snowflake Documentation, "Preparing your data files", retrieved: Oct. 14, 2024, availabe: https://docs.snowflake.com/en/user-guide/data-load-considerations-prepare.html.
Snowflake Documentation, "Preparing to load data", retrieved: Oct. 14, 2024, available: https://docs.snowflake.com/en/user-guide/data-load-prepare#supported-data-types.
Snowflake Documentation, "Bulk loading from a local file system", retrieved: Oct. 14, 2024, availabel: https://docs.snowflake.com/en/user-guide/data-load-local-file-system.
Oracle, "Generation a Node Count Estimate", retrieved: Oct. 14, 2024, available: https://docs.oracle.com/en-us/iaas/mysql-database/doc/generating-node-count-estimate.html#GUID-0F9C7157-AC89-4BDE-A663-CF15D2922001.
MySQL, "Manage Data in HeatWave with Workspaces", retrieved: Oct. 14, 2024, available: https://dev.mysql.com/doc/heatwave-aws/en/heatwave-aws-workspace-managing-hw-data.html.
Amazon, "Use a COPY command to load data", retrieved: Oct. 14, 2024, available: https://docs.aws.amazon.com/redshift/latest/dg/c_best-practices-use-copy.html.
Amazon, "Loading data files", retrieved: Oct. 14, 2024, available: https://docs.aws.amazon.com/redshift/latest/dg/c_best-practices-use-multiple-files.html.
Amazon, "Data types", retrived: Oct. 14, 2024, available: https://docs.aws.amazon.com/redshift/latest/dg/c_Supported_data_types.html.
Amazon, "Compare different node types for your workload using Amazon Redshift", retrived: Oct. 14, 2024, available: https://aws.amazon.com/blogs/big-data/compare-different-node-types-for-your-workload-using-amazon-redshift/.
Amazon, "Cluster Operation", retrieved: Oct. 14, 2024, availabe: https://docs.aws.amazon.com/redshift/latest/mgmt/managing-clusters-console.html#create-cluster.

\* cited by examiner

AUTOMATING DATA LOAD OPERATIONS FOR IN-MEMORY DATA WAREHOUSES

FIELD OF THE INVENTION

The present disclosure relates to loading operations and, more specifically, to techniques for automatically performing parallel load operations to load database objects from on-disk database systems into in-memory database systems.

BACKGROUND

In general, in-memory database systems perform much better than on-disk databases systems, since access to data items stored in volatile memory is several magnitudes faster than access to data items stored in non-volatile memory, such as a magnetic disk. However, many existing database systems are still on-disk systems. Unfortunately, the process of migrating a database from an on-disk database system to an in-memory database system is largely manual, labor intensive, and error-prone. For example, in-memory storage is significantly more expensive than disk storage, so an in-memory database system is likely to have less storage than an on-disk system. During the manual loading process, the in-memory database system may run out of storage before the data from the on-disk database has been fully migrated. Additional disk-to-memory database object loading problems may include, but are not limited to, the in-memory database system's failure to support certain data types, The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Auto-parallel-load techniques are provided for automatically loading database objects from an on-disk database system into an in-memory database system. The auto-parallel-load techniques involve a pipeline that includes several components, each of which is configured to perform a distinct load-related task during the loading process. In one implementation, each of the pipeline components is configured to receive an input "state object", perform a load-related task based on information obtained from the state object, and produce an output state object. The output state object produced by each pipeline component is then used as the input state object for the subsequent pipeline component. The state object that is produced by a given pipeline component may be an augmented version of the state object that was input to the given pipeline component, where the augmentation includes information (e.g. estimates) that is added to the state object by the given pipeline component based on the load-related task performed by the given pipeline component.

In one implementation, an auto-parallel-load process is initiated by a single "load call" sent to an auto-parallel-load module. In response to the load call, the auto-parallel-load module initializes a state object for the load operation, and invokes the various components of the pipeline in sequence. The sequence and content of the calls made by the auto-parallel-load process to the pipeline components may be based, at least in part, on the values of input parameters that were passed to the auto-parallel-load module in the load call.

System Overview

Figure 1:
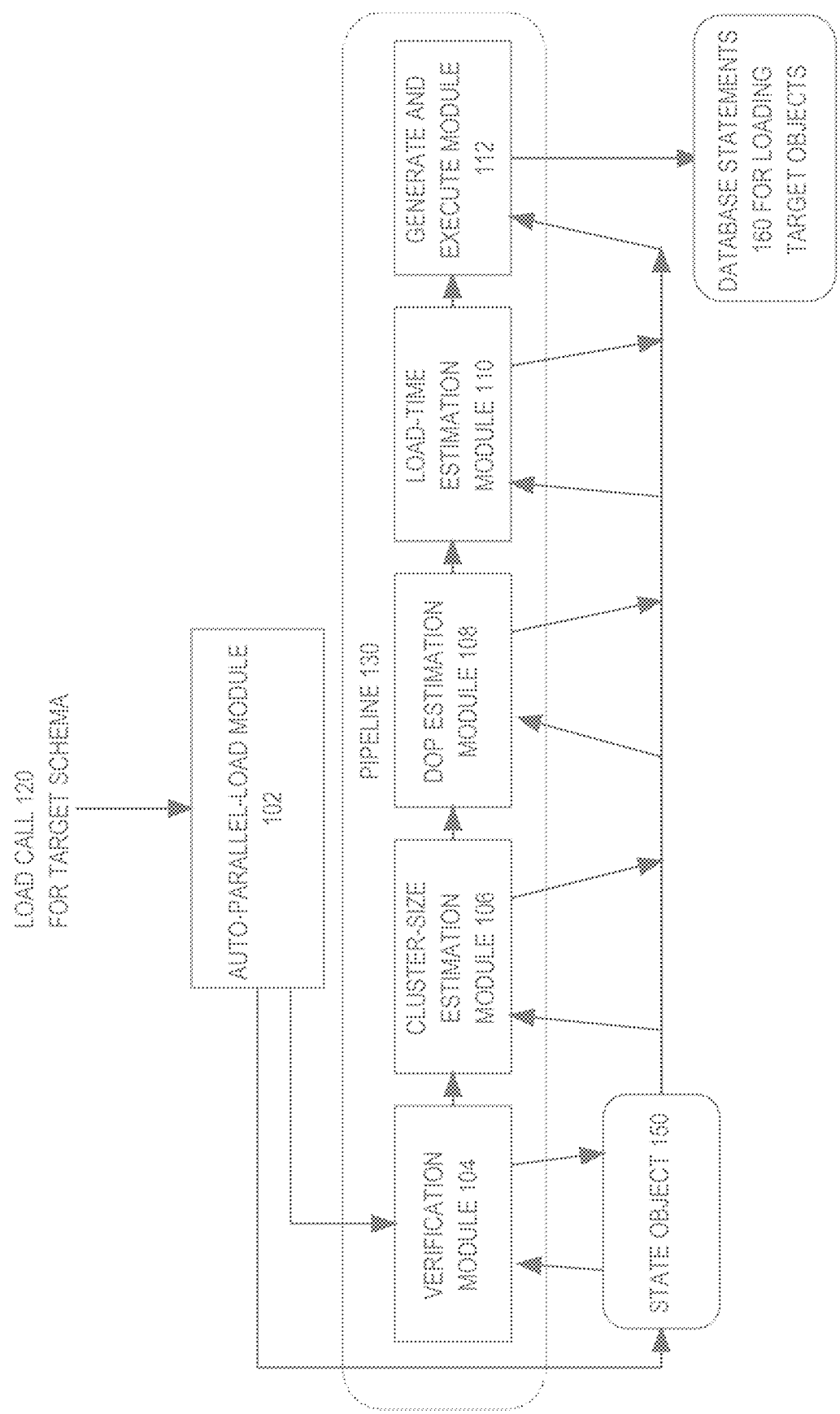
FIG. 1 is a block diagram of a pipeline for performing an auto-parallel-load operation, according to an implementation.

FIG. 1 is a block diagram of a system for automatically loading objects from an on-disk database system to an in-memory database system, according to one implementation. Referring to FIG. 1, an automated load operation is initiated by making a load call 120 to an auto-parallel-load module 102. In one implementation, the load call 120 specifies one or more schema, of one or more on-disk databases, that contain the database objects (the "target objects") that are to be loaded into an in-memory database. The load call may indicate one or more entire schemas, or may indicate one or more specific database objects in on-disk schemas. If the load call indicates one or more entire schemas, then all database objects in the schemas are treated as target objects for the purpose of the auto-load operation. Otherwise, the target objects include only those database objects specifically indicated in the load call 120.

In response to the load call 120, the auto-parallel-load module 102 initializes a state object 150. As shall be described in greater detail hereafter, the state object 150 is initially populated with metadata about the target objects. This information may be retrieved, by the auto-parallel-load module 102 from the on-disk database system that contains the target objects.

Once the state object 150 has been initialized, the auto-parallel-load module 102 calls the first module in the auto-parallel-load pipeline 130. Each module in the auto-parallel-load pipeline 130 is invoked in sequence. In the illustrated implementation, the auto-parallel-load module 102 invokes the first module in pipeline 130, and then each module in pipeline 130 invokes the subsequent module. However, in an alternative implementation, the auto-parallel-load module 102 may, in response to completion of each module of pipeline 130, directly invoke the subsequent module. For example, upon completion of verification module 104, auto-parallel-load module 102 may invoke cluster-size estimation module 106, and upon completion of cluster-size estimation module 106, auto-parallel-load module 102 may invoke Degree of Parallelism (DOP) estimation module 108. The automated load techniques described herein are not limited to any particular manner of invoking the modules that belong to the pipeline 130.

When invoked, each module in pipeline 130 reads information from the state object 150, performs a load-related task, and then updates the state object 150. Thus, as the state object progresses down the pipeline 130, the state object is repeatedly augmented with additional information. When read by the final module of the pipeline 130, the state object 150 contains all of the information needed to automatically generate the statements which, when executed by the in-memory database server, cause the target objects to be loaded into the in-memory database system in an optimal manner.

In the illustrated example, the pipeline 130 includes verification module 104, cluster-size estimation module 106, DOP estimation module 108, load-time estimation module 110, and generate and execute module 112. Generate and execute module 112 generates the database statements 160 for loading the target objects, and causes the statements to be executed by the in-memory database system. Each of these components shall be described in greater detail hereafter.

Thus, at a high-level, the auto-loading techniques described herein use a pipeline architecture where multiple components provide the desired functionality. These components communicate and propagate their output using a shared "State Object" (SO). The SO is initialized at the start of pipeline execution and is used as a storing mechanism and decision-making utility the different components use. As discussed in greater detail hereafter, many of these components contain subcomponents that perform certain functions and can also contain Machine Learning models which help their decision making.

The Load Call

As mentioned above, an auto-parallel-load operation is initiated when a load call 120 is made to the auto-parallel-load module 102. In one implementation, such a call has the following format:
CALL sys.heatwave.load(JSON_ARRAY('schema', . . . ), JSON_OBJECT(options)

In one implementation, the auto-parallel-load module 102 is implemented as a stored procedure. In such an embodiment, database administrators (DBAs) can trigger an auto-parallel-load operation by issuing such a call statement to the stored procedure.

In this example, the stored procedure accepts two parameters. The first input parameter is an array of target schemas that the DBAs may want to load.

The second parameter in the illustrated load call 120 is an optional parameter for adjusting auto-parallel-load execution. Some of the options that may be specified by this second parameter may include, but are not limited to:

['mode', {'normal'|'dryrun'}]
['output', {'normal'|'silent'|'compact'|'help'}]
['sql_mode', 'sql_mode']
['policy', {'disable_unsupported_columns'|'not_disable_unsupported_columns'}]
['set_load_parallelism', {TRUE|FALSE}]
['use_load_time_estimation', {TRUE|FALSE}]
['exclude_list', JSON_ARRAY ('db_object'[, 'db_object'] . . . )]

In this example, the 'mode' option controls whether auto-parallel-load operation should run in "dry run" mode where no loading of data actually takes place.

The 'output' option controls the verbosity of the auto-parallel-load operation.

The 'sql_mode' option indicates a SQL mode (some SQL databases have different supported modes of SQL). This option may be used to cause the auto-parallel-load operation to adjust to user-preference regarding this option.

The 'policy' option allows DBAs to adjust whether loading a table with unsupported data types can succeed by disabling the unsupported columns or fail completely printing an error message.

The 'set_load_parallelism' option allows DBAs to specify whether they want auto-parallel-load operation to automatically tune the number of load threads to use when loading a table.

The 'use_load_time_estimation' option controls whether information about load times of different tables should be conveyed.

The 'exclude_list' allows DBAs to exclude certain database objects (tables, schemas) from being evaluated and loaded.

These are merely examples of the options that may be specified in the load call, and the auto-parallel-load techniques described herein are not limited to any particular set of input options.

Initializing the State Object

At the auto-parallel-load operation's initialization stage, the state object 150 is initialized along with other configuration parameters. As part of the initialization stage, various checks are in place to identify whether the destination data-warehouse (the target in-memory database system) is in the right state and can accept incoming load statements. In one implementation, the objects initialized by the state object 150 include a Table Metadata (TM) object, and a Column Metadata (CM) object. These objects hold metadata information about the tables and columns of the target objects that the DBA wishes to load into the in-memory database system. As shall be described in greater detail hereafter, the metadata contained in these objects is later utilized by components with machine learning (ML) models.

In one implementation, the metadata contained in the TM object for a given table includes:

A table's name and the name of the database it belongs.
Various attributes characterizing the size of a table, like (i) number of rows (ii) size of the file where table is stored (iii) size of data including the size of any auxiliary objects like indexes.
Mappings of their data types to data types in the destination data warehouse.
Attributes to store features and predictions of underlying models, like Cluster-size Estimation and Load-time estimation.
Information regarding loading status of the table.
Post-load feedback regarding the actual size of the table in the destination warehouse and the time it required to load
Whether table can be loaded and whether it contains columns that cannot be loaded.

In one implementation, the metadata contained in the CM object for a column of a given table includes:
Name of column and names of table and database to which the column belongs.
Column data type.

Whether the column is supported and can be successfully loaded.

Whether the column is of a string data type and how it should be encoded. Data warehouses often provide encoding mechanisms for string-type data as these types of columns have higher storage requirements. By offering alternative encoding mechanism data warehouses (especially in-memory) can store these data in alternative ways.

For string columns, the auto-parallel-load module 102 also samples a proportion of their data such as 100K<sampledRows≤1M. Based on this sampling, the auto-parallel-load module 102 identifies possible values exceeding the maximum length allowed, which would make the column unsupported for loading into the destination warehouse (the in-memory database system). This sampling also allows for more accurate estimation of the size a column will require on the destination database, as information such as the average length of the strings are collected.

The Verification Module

In one implementation, two distinct tasks are performed by verification module 104: (a) a "data gathering phase" in which all the required information and metadata needed by all stages in the pipeline are gathered and stored in the state object 150, and (b) a "verification phase" in which columns and tables specified by the user are examined and verified.

During the data gathering phase, the verification module 104 pulls all relevant metadata information from the definitions of tables and columns. Metadata tables in the source on-disk database are the source from which this information may be extracted. In one implementation, the data gathering phase is also when one of the first checks happens, as specified tables/schemas that do not currently exist in the source database system, or that the user has no access to, are ignored.

Specifically, the verification module 104 first collects information regarding the configuration of the destination data warehouse such as load configuration parameters that (i) describe which storage format will be used (ii) whether data will be compressed by default (iii) whether string variables will be encoded. Second, metadata information regarding schemas/tables/columns are collected and stored in the TM object and the CM object. This metadata includes sizes of tables, number of partitions that a table may have, a table's file size, size of indexes, column data types, cardinality of a table and other relevant information that would help us perform checks and verify that schemas/tables/columns can be loaded in the destination database. As shall be described in detail hereafter, this metadata is also used as input to ML models that are used later in the pipeline.

During the verification phase, several rules are examined for each schema/table/column that is to be loaded. If any of those rules is violated, then the verification module 104 marks the violating schema/table/column as not valid for loading into the destination warehouse. In one implementation, the verification module 104 performs checks for the following target schemas (SR) rules, target tables (TR) rules, and target column (CR) rules:

SR: Check if it is a system schema used by the source database. In this case it is excluded from the list.

SR: Check if it is part of the exclude_list defined by the DBA.

TR: Examine if table is stored using an engine that is supported by the destination data warehouse. Multiple storage engines might yet not be supported.

TR: The source database might support multiple table types (base tables, views, temporary tables) however the destination data warehouse might not support all types. Hence a check is performed to see if table is of the supported type.

TR: Check whether the table is already loaded, or it is in the process of being loaded.

TR: Typically, relational databases use indexes to store records. Multiple index types may exist which may not be supported by the destination warehouse. If the Primary Key is indexed using one of the unsupported index types a rule is triggered to prohibit such table from loading.

CR: Whether column should be ignored as it might be explicitly marked by the DBA.

CR: A string column exceeding the maximum string length that the destination warehouse supports.

CR: Having an unsupported data type or in general being of a type that is unsupported by the destination data warehouse.

CR: Columns with invalid syntax when supplying loading configuration options.

CR: String columns may be encoded using different character sets which might be unsupported in destination data warehouses. Hence, a list of those unsupported character sets is kept, and incoming columns are checked.

CR: Whether load configurations conflict with each other and will cause issues during load. For instance, columns that will be used for partitioning may not be encoded using a dictionary encoding.

The Cluster-Size Estimation Module

Figure 2:
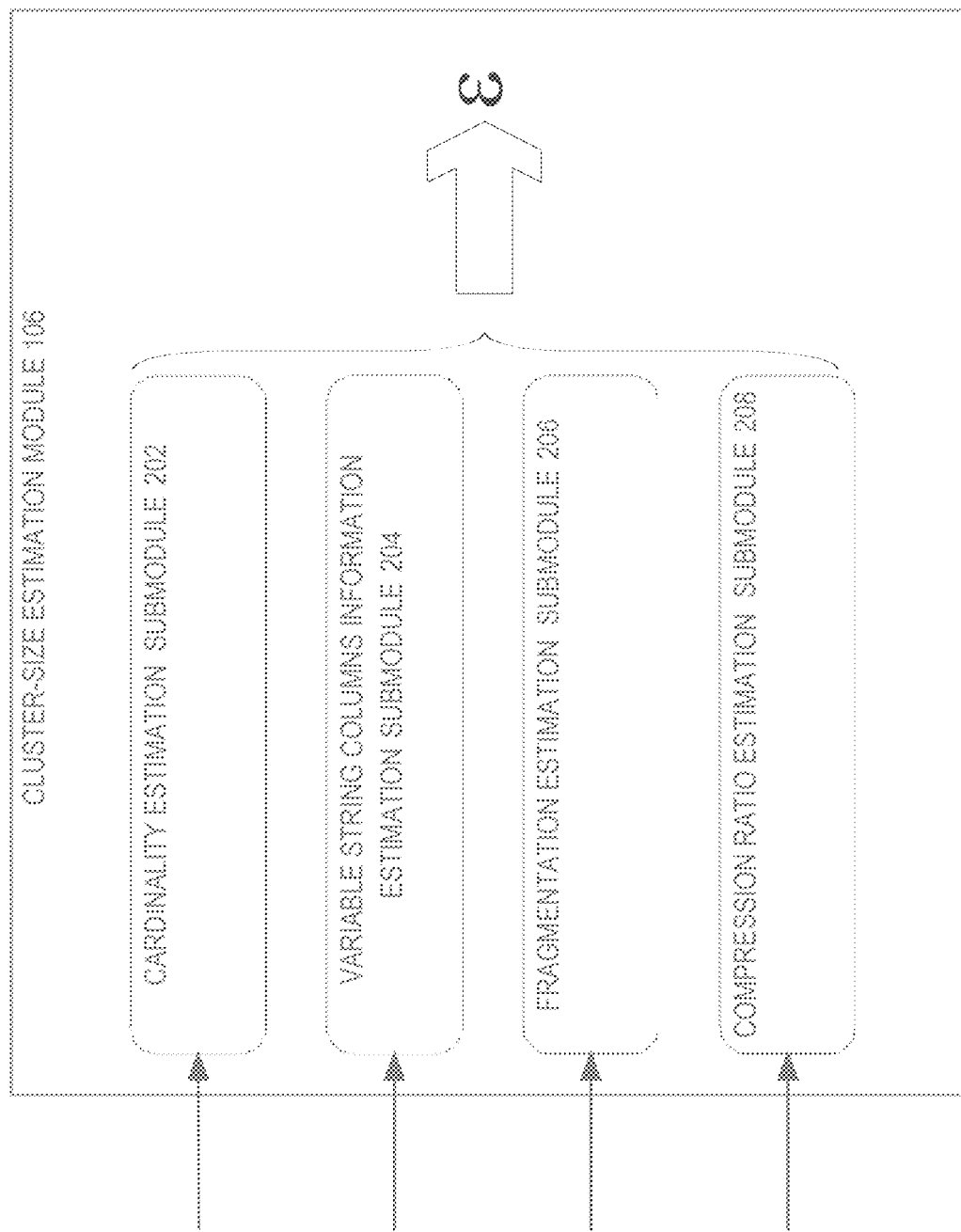
FIG. 2 is a block diagram illustrating the submodules of a cluster-size estimation module, according to an implementation.

In one implementation, the cluster-size estimation module 106 involves a set of submodules that are used to generate a set of constituent estimates. The set of constituent estimates are used by the cluster-size estimation module 106 to generate a cluster-size estimate. Specifically, FIG. 2 illustrates an implementation in which cluster-size estimation module 106 includes a cardinality estimation submodule 202, a variable string columns information estimation submodule 204, a fragmentation estimation submodule 206, and a compression ratio estimation submodule 208. In the illustrated implementation, the cluster-size estimation module 106 generates a value "ε" based on the outputs of each of these submodules.

The cluster-size estimation module 106 estimates "cluster size" for a target object, where the cluster size of an object is the amount of memory that the in-memory destination warehouse will require to store the database object. In one implementation, a rough estimate of the amount of memory required is calculated by the cluster-size estimation module 106 based on estimates of the total number of rows and data types of the data that will be loaded. This rough estimate is then adjusted by a value ε which, as mentioned above, is based on the estimates generated by the various submodules. The following formula illustrates how an adjusted cluster-sized estimate may be generated:

$$S = N * \sum_i d(col_i) + \epsilon$$

In this formula, S is the total size of data using the data types available in the destination data warehouse, N is the total number of rows and function d: dt→width, is a mapping from the data type of a column to its width and "ε" is an adjustment variable that encapsulates adjustments for several sources of randomness. The summation is over all columns that can be loaded (some columns may have been disabled during the verification stage).

As designated by "ε", there are additional factors which may make an accurate estimate hard to obtain. These include but are not limited to (i) string column encoding using dictionaries, (ii) storing data in a compressed format, (iii) fragmentation during data load operations, (iv) inaccurate estimates for the total number of rows, (v) string columns that have no predefined width such as string columns with no clear bounds. Each of these problems is solved by Machine Learning (ML) models that are implemented in the various submodules of the cluster-size estimation module 106.

Specifically, in one implementation, each of submodules 202-208 generates estimates/adjustments based on a respective trained machine learning (ML) model. In such an implementation, cardinality estimation submodule 202 includes an ML model that is trained to generate an adjustment that improves the estimate of N. Variable string columns information estimation submodule 204 includes an ML model that is trained to generate good estimates for unknown width of columns. Fragmentation estimation submodule 206 includes an ML model that is trained to generate an adjustment that improves the estimate of fragmentation based on table characteristics. Compression ratio estimation submodule 208 includes an ML model that is trained to estimate compression ratio for a target table. How such ML models may be built shall be described in greater detail hereafter.

Once the cluster-size estimation module 106 has finished the task of estimating table size information, the cluster-size estimation module 106 stores the table size estimates in the state object 150.

According to one implementation, the inputs/outputs of the various submodules of cluster-size estimation module 106 are as follows:

Cardinality Estimation Submodule 202

Input Features: number of columns, number of rows, number of columns with data width {16, 1, 2, 32, 4, 8} bytes, Output: adjusted estimate of number of table rows Variable String Columns Information Estimation Submodule 204

Input Features: average string length of N rows for each table, where N is dynamically determined Output: adjusted estimate for width of variable string columns Fragmentation Estimation Submodule 206

Input Features: number of partitions, maximum number of threads, file size of table Output: overhead estimate due to fragmentation Compression Ratio Estimation Submodule 208

Input Features: number of string columns, number of int columns, number of float columns, number of datetime columns, number of dictionary encoded columns, estimated number of rows, percentiles of compression ratio in training set Output: compression ratio of table The Degree of Parallelization (DOP) Estimation Module In one implementation, the DOP estimation module 108 also uses ML models to identify the right degree of parallelization to use when loading the target objects into the in-memory database system. In one implementation, the DOP estimation module 108 estimates DOP on a per-target-object basis. For example, DOP estimation module 108 may determine that 10 threads should be used to load table T1 from the on-disk database into the in-memory database, while 4 threads should be used to load table T2. Identifying the right degree of parallelization is important because an underestimate of load threads would mean larger load times, degrading user experience. On the other hand, an overestimate would mean overusing system resources that could be allocated to other operations. In addition, overestimations exacerbate fragmentation issues.

Figure 3:
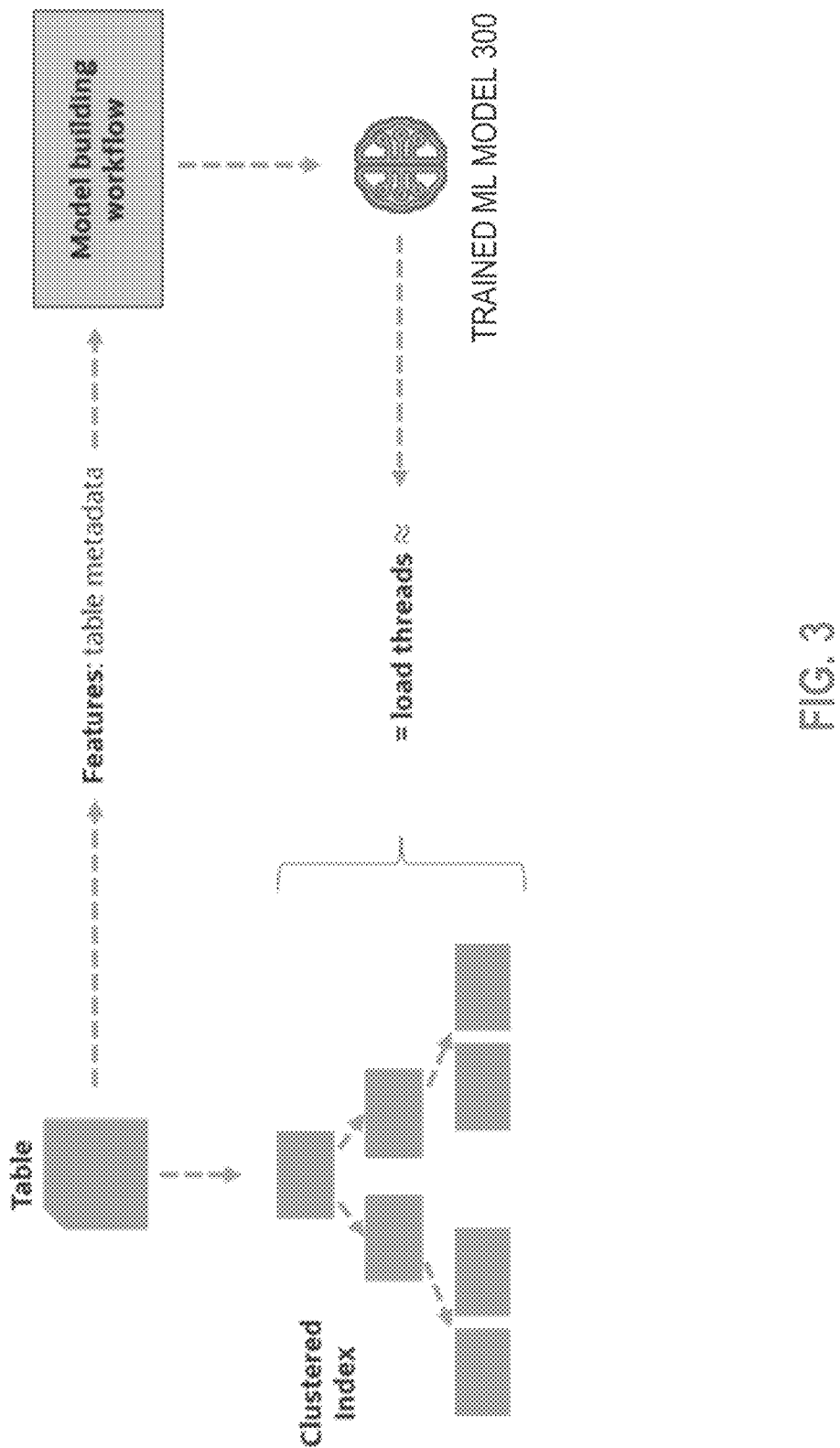
FIG. 3 is a block diagram that illustrates components involved in training an ML model to estimate an optimal amount of threads to load a target object, according to an implementation.

FIG. 3 is a block diagram that shows the input and output of an ML model used by DOP estimation module 108. Referring to FIG. 3, the table metadata of the target table is fed to a model building workflow. The model building workflow is used to create the trained ML model 300, which in turn is used by the DOP estimation module 108 to generate estimates of the active number of load threads needed to load a target table with the optimum degree of parallelism.

As shown in FIG. 3, it is possible to derive an optimal number of load threads by inspecting a clustered index of the source on-disk database. Clustered indexes are explained at learn.microsoft.com/en-us/sql/relational-databases/indexes/clustered-and-nonclustered-indexes-described?view-sql-server-ver16, the contents of which is incorporated by this reference. However, the clustered index is an internal structure to which external processes, such as DOP estimation module 108, do not have access. In the absence of information about the clustered index, DOP estimation module 108 uses table metadata as proxies to this internal structure, and trains ML model 300 to accurately estimate the optimal number of load threads.

In one implementation, many metadata attributes are considered during the modeling process, but the model building workflow only keeps the metadata attributes that exhibit high correlation with the target variable (in this case, the optimal number of threads). Correlation is measured by conducting multiple experiments where tables are loaded under multiple configurations. Both table metadata and optimal number of load threads are recorded. An optimal number of load threads is identified by adjusting load configuration and identifying which configuration yields the lowest fragmentation and best load time. Once the ML model 300 is trained, it is incorporated into DOP estimation module 108 in the pipeline process, and used to assign an estimate of load threads for each target table. By estimating the optimal number of load threads in this manner, the amount of fragmentation is reduced. Further, reduction in the fragmentation results in less memory consumed during the load operation.

The Load-Time Estimation Module

The load-time estimation module 110 generates load time estimates for all target objects. This information can be utilized to schedule loading of tables at timeframes where low activity is present. The load time estimates can also be used by DBAs to decide whether they want to load more/fewer tables. An ML model is used to generate these estimates. The model is trained using a synthetic dataset generated by experiments where several tables are loaded under different configurations. Various parameters are recorded, and their predictive performance is measured to identify potential features.

The Generate-and-Execute Module

The final stage of an auto-parallel-load operation is the generation of SQL statements that will be executed to cause the in-memory database system to load the target objects in an optimal manner based on the estimations generated in the previous stages of the pipeline 130. This load-related task is performed by the generate and execute module 112 based on the state object 150. Specifically, based on the information that was added to state object 150 by prior pipeline modules, generate and execute module 112 generates and executes SQL statements so that tables can be loaded into the in-memory destination warehouse.

The following is an example of SQL statements that may be generated by generate-and-execute module 112 to load a target object (schema_name.table_name) into an in-memory database system:
SET SESSION innodb_parallel_read_threads=3;
ALTER TABLE 'schema_name'. 'table_name' SECONDARY_ENGINE=RAPID;
ALTER TABLE 'schema_name'. 'table_name' SECONDARY_LOAD;

In this example, the initial command modifies the number of load threads based on the estimation produced by the DOP estimation module 108 for this particular target object (the "table_name" table). The subsequent commands turn on the capability of loading the table into the in-memory data-warehouse, and then execute the load operation.

Building the Machine Learning (ML) Models Used by Pipeline Components

Figure 4:
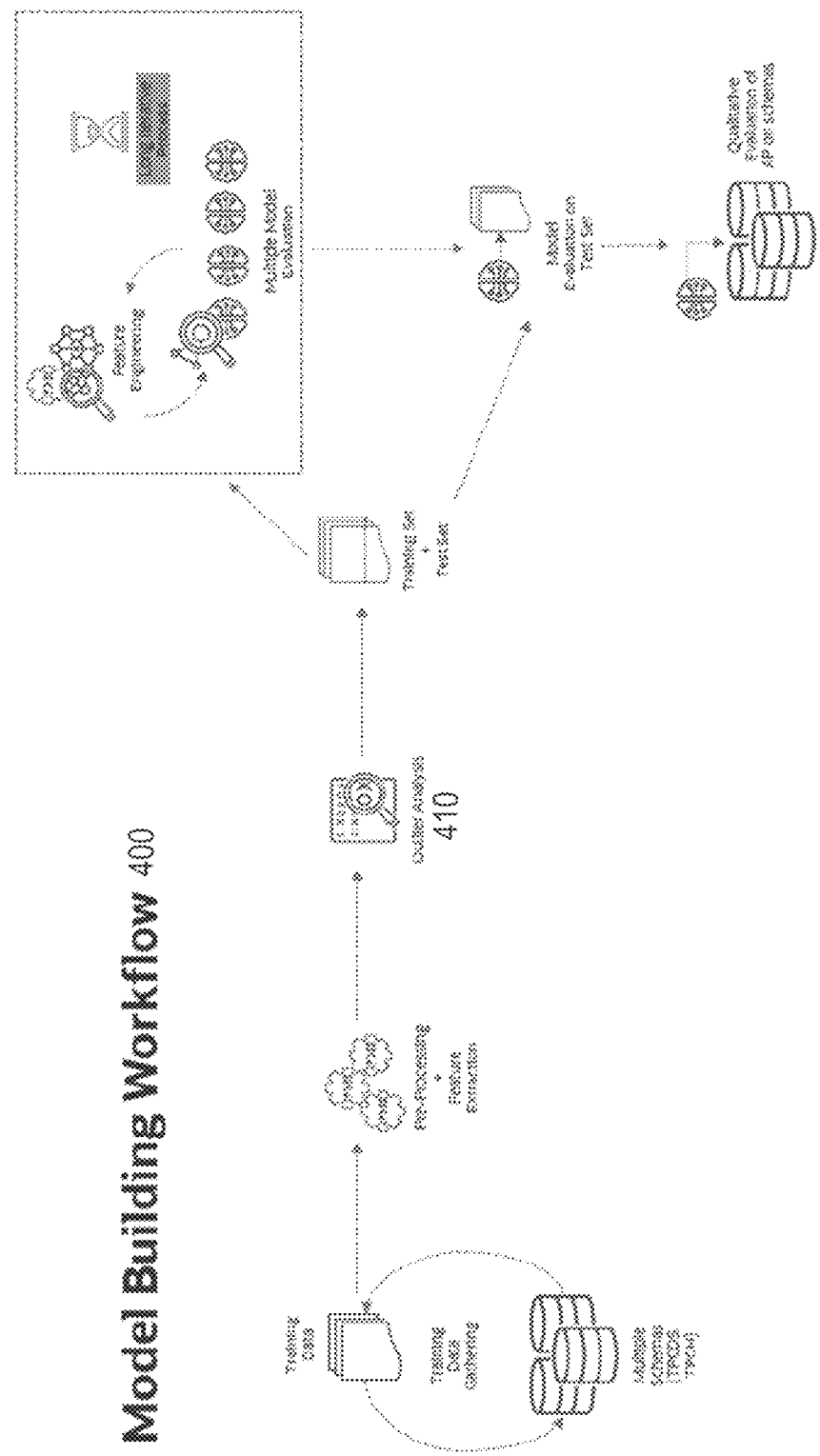
FIG. 4 is a block diagram that illustrates phases of a model building workflow, according to an implementation.

As explained above, various components and subcomponents of pipeline 130 make use of trained ML models. According to one implementation, all such ML models are built using a similar model building workflow. The input features to the ML models vary, based on which object features have a high correlation with the respective estimations they are being trained to perform). FIG. 4 is a block diagram that illustrates such a model building workflow according to one implementation. In particular, FIG. 4 illustrates how the ML model used by the load-time estimation module 110 may be built.

As explained above, the load-time estimation module 110 generates load time estimates for all target tables. This information can be utilized to schedule loading of tables at timeframes where low activity is present. It can also be used by DBAs to decide whether they want to load more/less tables.

In the implementation illustrated in FIG. 4, the ML model is used to generate these estimates is trained using a synthetic dataset generated by experiments, where several tables are loaded under different configurations. Various parameters are recorded, and their predictive performance is measured to identify potential features.

Referring to FIG. 4, during a synthetic experiment phase, the model building workflow (MBW) 400 loads a table using configuration $C \subset L \times D$, where $L \times D$, is a set of all possible combinations for different numbers of load threads and different numbers of dictionary-encoded string columns. MBW 400 uses the same configuration C, multiple times such that $C=\{c_1, \ldots, c_n\}$, because of the dynamic nature of load times.

However, there might be a case where some of the load times recorded by the same configuration are erroneous due to noise in the underlying system. Especially in cloud environments, noisy neighbors (e.g. VMs sharing the same resources) may introduce such noise during experiments. To alleviate noise, the MBW 400 employs an outlier detection and elimination mechanism 410 to avoid using these training examples in to train the ML models.

In one implementation, the outlier detection and elimination mechanism 410 estimates the probability of one $c_i$, producing an erroneous load time y, by $Pr(y_i)=$ $$\frac{|\text{median}(y) - y_i|}{\sum_i |\text{median}(y) - y_i|}$$

where y is a vector containing the recorded load times of repetitions in C. Some configuration runs are then eliminated to produce a subset of C. In one implementation, the subset=

$[c_i | Pr(y_i) < 0.9]$

Figure 5:
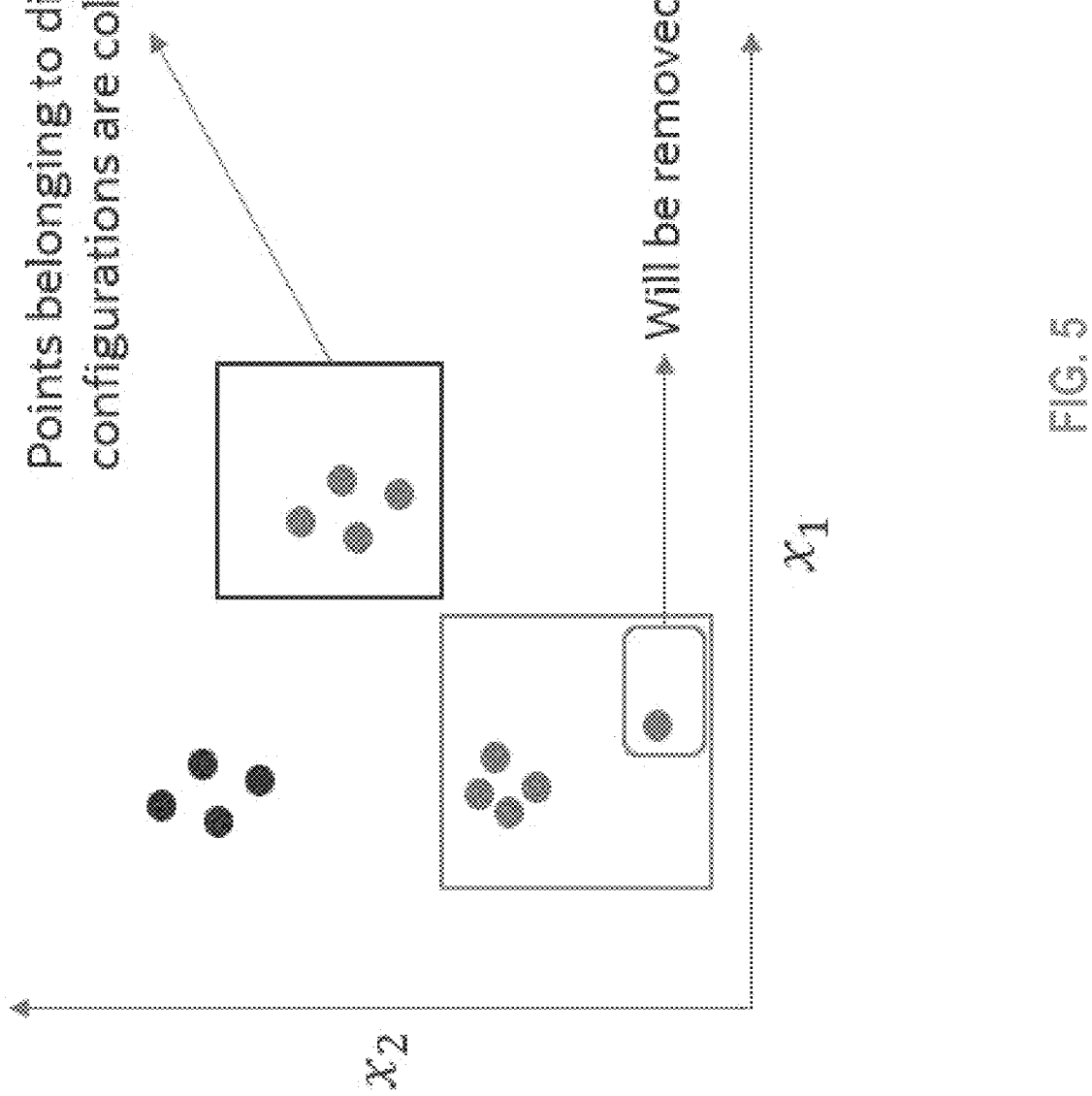
FIG. 5 is a block diagram that illustrates outlier elimination, according to an embodiment.

FIG. 5 is a block diagram that visually depicts the outlier detection and elimination process.

As shall be described in greater detail hereafter, the estimates generated by the components of pipeline 130 may be generated using linear ML models. The anomaly removal process is important in such situations because linear models are particularly susceptible to outliers in a training set. Including outliers in the training set will skew the optimization process that is tasked with identifying the right weights/coefficients of the linear model formula.

For example, during one training data collection process, some cases where a table with the same configuration had load times of 2700 s, 2700 s, 3400 s (in subsequent measurements). By using an anomaly removal process, the outlier (3400) was eliminated.

After eliminating outliers, the ML models are trained using the outlier-free training set. According to one implementation, the training points are split into training and testing sets. Different models are compared by evaluating their accuracy using standard accuracy metrics for regression problems like R2, RMSE, or MAPE. At this stage, extensive feature engineering work may be performed. Feature engineering is a process for customizing features to improve model accuracy. Through this process, it is determined which combination had the most accuracy, where each combination includes (i) number load threads "lt", (ii) number of dictionary columns "dc", and (iii) table size "ts" had the most accuracy.

$$\text{lt\_dc\_ts} = \frac{ts}{\ln(1+lt)} * \max(1, \log_{10}(10+dc))$$

Use of Linear Ml Models

The components of pipeline 130 that use trained ML models to generate estimates for a given target object may generate those estimates by inputting the appropriate features of the target object into their respective trained ML models. Various types of ML models may be used for this purpose. In one implementation, linear ML models are used to dynamically generate estimates more efficiently.

As an example, to create a linear ML model for the load-time estimation module 110, the lt_dc_ts feature is normalized and incorporated directly into a generalized linear model that approximates the output of the trained ML model. Before a linear model that is produced in this manner is used in a production environment, one may perform subsequent qualitative control tests where its accuracy is measured using several database schemas/tables with varying sizes.

For each linear ML module, the lt_dc_ts formula is a hand-crafted formula based on domain knowledge. If accuracy of the linear ML model exceeds some threshold (e.g. a MAPE of less than 10%), the linear model can be deployed in the corresponding components of pipeline 130.

For deploying the linear model for load-time estimation in the load-time estimation module 110, the lt_dc_tc formula is serialized into a linear equation. This helps increase efficiency, as to generate a prediction a simple mathematical operation is executed with no requirements of loading the corresponding ML model from disk into runtime or calling the ML model from another remote process. Using a linear ML model in this fashion also helps with interpretability, as the linear ML model can easily be inspected. The following equation shows what a model used by the load-time estimation module 110 may look like in code:

$$\text{load\_time\_pred} = \text{MAX}\left(0, \text{intercept} + c0 * \frac{(\text{lt\_dc\_ts} - m)}{s}\right)$$

where m and s are the normalization factor used. The load-time estimation thus produced by load-time estimation module 110 is stored in the state object 150 for each target object (e.g. each valid table that was verified during the verify stage of the pipeline).

This lt_dc_ts formula given above is an example of a formula that is hand-crafted based on domain knowledge. The formula has been evaluated during the feature engineering/model building workflow and found to work better than other feature combinations.

In this formula, the first term:

$$\frac{ts}{\ln(1+lt)},$$

corresponds to the domain knowledge that load threads (lt) parallelize loading a table (hence being the divisor of ts) but with diminishing benefit once they reach a certain scale (hence the logarithm). In addition, the second term is used to account for the fact that the sizes of dictionaries contribute to the total load time but, since access to the total dictionary size is prohibitive, this term is multiplied with ts to gauge the same effect. However, the term dc is wrapped within a logarithmic function to prohibit wild extrapolations.

Training Set Coverage

Analytical workloads contain only a subset of any given input feature domain. However, by modelling certain dataset size ranges, certain query operators can cover a significant portion of the customer use case. Therefore, by using synthetic and realistic datasets, covering a sufficient training dataset is possible for analytical workloads.

However, there may still be combinations of predictor values that will fall outside of the training data. Linear models are able to extrapolate. To safeguard against wild extrapolations, the estimations may be bounded so that they fall within a known domain, or some other safety mechanism may be applied.

An example of bounding a linear model is shown in the formula, discussed above, for load-time estimations:

$$\text{load\_time\_pred} = \text{MAX}\left(0, \text{intercept} + c0 * \frac{(\text{lt\_dc\_ts} - m)}{s}\right)$$

In this case, the minimum extrapolation is bounded to 0, so that no negative values for load-time estimation are reported. In addition, lt_dc_ts is carefully crafted such that it matches existing domain knowledge. For example, with increasing load threads, load time should not linearly decrease.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
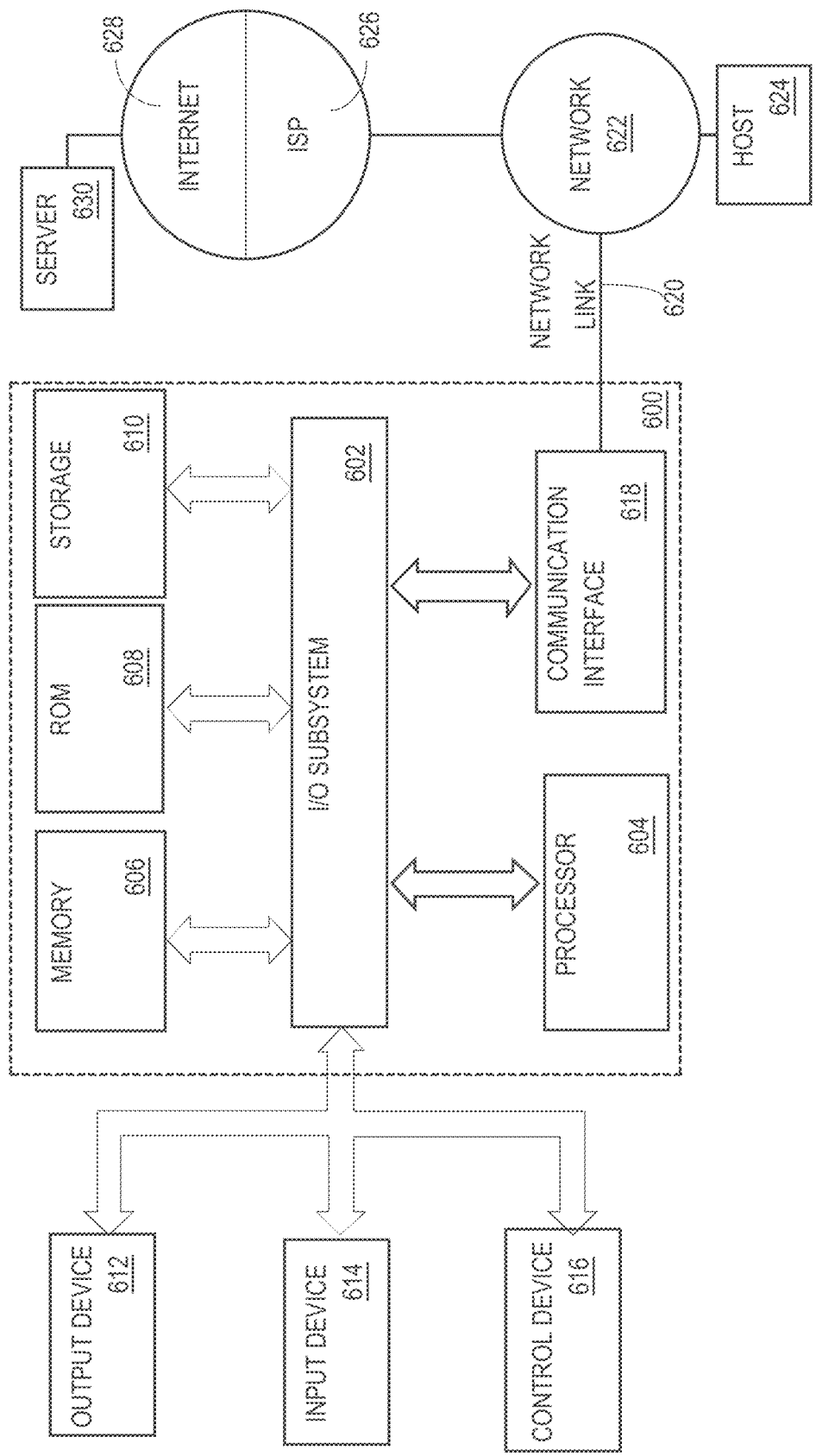
FIG. 6 is a block diagram that illustrates a computer system that may be used to implement the auto-parallel-load operations described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for performing an auto-parallel-load operation that loads a set of target objects, currently residing in an on-disk database system, into an in-memory database system, comprising:
    initiating the auto-parallel-load operation by a single load call made to an auto-parallel load module, wherein the single load call includes information that indicates a particular set of objects;
    in response to the single load call, initiating a state object that includes metadata for one or more target objects in the set of target objects; and
    invoking each pipeline module of a plurality of pipeline modules in sequence:
    wherein the plurality of pipeline modules includes one or more pipeline modules that:
        generate estimates based on the metadata, contained in the state object, about the one or more target objects; and
    augment the state object by storing the estimates in the state object;
    wherein the auto-parallel-load operation involves a plurality of load-related tasks;
    wherein each module of the plurality of pipeline modules performs a distinct load-related task of the plurality of load-related tasks;
    wherein invoking each pipeline module includes:
        invoking a particular pipeline module that generates, for each target object in the set of target objects, an estimate based on:
            features of the target object; and
            output generated by a trained machine learning (ML) model that has been trained to generate estimates for target objects based on the features of the target objects; and
        invoking a generate-and-execute module that is configured to generate database statements which, when executed, cause the in-memory database system to load the target objects based on the estimates that were generated for the target objects;
    wherein the method is performed by one or more computing devices.

2. The method of claim 1 wherein the particular pipeline module is a cluster-size estimation module that is configured to estimate an amount of memory that the in-memory database system will require to store the set of target objects.

3. The method of claim 2 wherein:
    the cluster-size estimation module includes a cardinality estimation submodule; and
    the ML model is trained to generate an adjustment that improves an estimate of how many rows are contained in target objects.

4. The method of claim 2 wherein:
    the cluster-size estimation module includes a variable string columns information estimation submodule; and
    the ML model is trained to generate size estimates for unknown width of columns.

5. The method of claim 2 wherein:
    the cluster-size estimation module includes a fragmentation estimation submodule; and
    the ML model is trained to generate an adjustment that improves an estimate of fragmentation based on table characteristics.

6. The method of claim 2 wherein:
    the cluster-size estimation module includes a compression ratio estimation submodule; and
    the ML model is trained to estimate compression ratios for target objects.

7. The method of claim 1 wherein the particular pipeline module is load-time estimation module that is configured to generate load time estimates for each target object.

8. The method of claim 1 wherein the trained ML model is a linear ML model.

9. The method of claim 1 wherein:
    invoking each pipeline module includes invoking a verification module; and
    the verification module determines the set of target objects by removing from the particular set of objects all objects that violate any verification rule in a set of verification rules.

10. The method of claim 1 wherein the generate-and-execute module generates the database statements based, at least in part, on estimates stored in the state object by the one or more pipeline modules.

11. The method of claim 1 wherein:
    the trained ML module is trained with a particular training set;
    the method further comprises generating the particular training set by:
        determining outputs produced by a set of training examples;
        based on the outputs, determining a subset of outlier training examples; and
        producing the particular training set by removing from the set of training examples the subset of outlier training examples.

12. One or more non-transitory computer-readable media storing instructions for performing an auto-parallel-load operation that loads a set of target objects, currently residing in an on-disk database system, into an in-memory database system, the instructions comprising instructions which, when executed by one or more computing devices, cause:
    initiating the auto-parallel-load operation by a single load call made to an auto-parallel load module, wherein the single load call includes information that indicates a particular set of objects;
    in response to the single load call, initiating a state object that includes metadata for one or more target objects in the set of target objects; and
    invoking each pipeline module of a plurality of pipeline modules in sequence:
    wherein the plurality of pipeline modules includes one or more pipeline modules that:
        generate estimates based on the metadata, contained in the state object, about the one or more target objects; and
    augment the state object by storing the estimates in the state object;
    wherein the auto-parallel-load operation involves a plurality of load-related tasks;
    wherein each module of the plurality of pipeline modules performs a distinct load-related task of the plurality of load-related tasks;

wherein invoking each pipeline module includes:
  invoking a particular pipeline module that generates, for each target object in the set of target objects, an estimate based on:
    features of the target object; and
    output generated by a trained machine learning (ML) model that has been trained to generate estimates for target objects based on the features of the target objects; and
  invoking a generate-and-execute module that is configured to generate database statements which, when executed, cause the in-memory database system to load the target objects-based on the estimates that were generated for the target objects.

13. The one or more non-transitory computer-readable media of claim 12 wherein the particular pipeline module is a cluster-size estimation module that is configured to estimate an amount of memory that the in-memory database system will require to store the set of target objects.

14. The one or more non-transitory computer-readable media of claim 12 wherein the particular pipeline module is load-time estimation module that is configured to generate load time estimates for each target object.

15. The one or more non-transitory computer-readable media of claim 12 wherein the trained ML model is a linear ML model.

16. The one or more non-transitory computer-readable media of claim 12 wherein:
  invoking each pipeline module includes invoking a verification module; and
  the verification module determines the set of target objects by removing from the particular set of objects all objects that violate any verification rule in a set of verification rules.

17. The one or more non-transitory computer-readable media of claim 12 wherein the generate-and-execute module generates the database statements based, at least in part, on estimates stored in the state object by the one or more pipeline modules.

18. The one or more non-transitory computer-readable media of claim 12 wherein:
  the trained ML module is trained with a particular training set;
  the one or more non-transitory computer-readable media further comprises generating the particular training set by:
    determining outputs produced by a set of training examples;
    based on the outputs, determining a subset of outlier training examples; and
    producing the particular training set by removing from the set of training examples the subset of outlier training examples.

* * * * *

UNITED STATES PATENT AND TRADEMARK OFFICE
CERTIFICATE OF CORRECTION

PATENT NO. : 12,248,444 B1  
APPLICATION NO. : 18/539928  
DATED : March 11, 2025  
INVENTOR(S) : Savva et al.

Page 1 of 1

It is certified that error appears in the above-identified patent and that said Letters Patent is hereby corrected as shown below:

In the Specification

In Column 1, Line 30, delete "types," and insert -- types. --, therefor.

In Column 4, Line 60, delete "load" and insert -- load. --, therefor.

In Column 7, Line 40, delete "bytes," and insert -- bytes --, therefor.

In Column 7, Line 45, delete "Nis" and insert -- N is --, therefor.

In Column 8, Line 21, delete "view-sql-" and insert -- view=sql- --, therefor.

In Column 10, Line 5, delete "[$c_i$|$Pr(y_i)$<0.9]" and insert -- {$c_i$|$Pr(y_i)$<0.9} --.

In Column 10, Line 27, delete "R2," and insert -- $R^2$, --, therefor.

In Column 10, Line 32, delete ""It"," and insert -- "lt", --, therefor.

In Column 10, Line 37, delete "It_dc_ts" and insert -- lt_dc_ts --, therefor.

In the Claims

In Column 15, Line 24, in Claim 1, delete "sequence:" and insert -- sequence; --, therefor.

In Column 16, Line 55, in Claim 12, delete "sequence:" and insert -- sequence; --, therefor.

In Column 17, Line 12, in Claim 12, delete "objects-based" and insert -- objects based --, therefor.

Signed and Sealed this  
Third Day of June, 2025

Coke Morgan Stewart  
*Acting Director of the United States Patent and Trademark Office*